3,090,688
Patented May 21, 1963

3,090,688
METHOD FOR MAKING DRIED SOUR CREAM
Peter P. Noznick, Robert H. Bundus, and Ingmar B. Eggen, all of Chicago, Ill., assignors to Beatrice Foods Co., Chicago, Ill., a corporation of Delaware
No Drawing. Filed Jan. 19, 1960, Ser. No. 3,254
1 Claim. (Cl. 99—56)

This invention relates to a powdered sour cream product, retaining the flavor, characteristics of a conventional sour cream, but not made from a cultured sour cream product.

In carrying out the invention, we preferably heat skim milk of about 8.5% to 9% solids content to 235° F. and hold for six seconds at this temperature, thereby in subsequent culturing forming a gel in a relatively short time due to the absence of competitive organisms. Ordinary pasteurization at 163° F./15 seconds may also be employed.

The milk is cooled to about 72° F. in an indirect heat exchanger of the tubular type. The milk at this temperature is inoculated and cultured with about ½ to 2% *Streptococcus lactis* (or *Streptococcus cremoris*) and allowed to incubate for about 14 hours at 71° F. Thereafter, butter oil in the form of melted butter at about 130° F. is added in amount to form an 18% butter fat product.

The mixture is now heated to about 120–130° F. and is homogenized at about 2000 p.s.i.

The homogenized mixture is then spray dried by spraying the sour cream into a drying chamber, e.g. Rogers type drier, to remove the moisture to achieve 96 to 98% total solids product. Air inlet temperature is about 300° F. and discharge air is 180° F.

While we have referred to a heating treatment to about 235° F. for six seconds in the foregoing example, this can be varied to include a temperature range of about 185° F. to 255° F. for two seconds to 400 seconds, or standard pasteurization of 143–180° F./30 minutes or 163–180° F./15 seconds. Following this heat treatment, cooling may be carried out to a temperature between about 70° F. to 90° F.

Any conventional type of culture organism may be used, and in addition to *Streptococcus lactis*, the following have been found satisfactory: *Streptococcus cremoris*; and with either organism, it is preferred that *Leuconostoc citrovorum* or *paracitrovorum* and/or other diacetyl producing organisms.

The incubation time given of about 14 hours may be varied between about three hours and sixteen hours in the temperature range between about 90° F. and 70° F., but the lower temperature is preferred for optimum flavor development (diacetyl and acetylmethylcarbinol).

The butter oil or butter added in the foregoing example to produce about an 18% butter fat product may be substituted by suitable vegetable oils, but this is not preferred.

In addition to butter oil or butter, any of the following may be used: Cream containing from 50–80% butterfat.

While we have referred to an 18% butterfat product, this may be varied to about 18% to 30% butterfat, and the oil or butter is preferably added in melted condition at a temperature between about 100° F. and 150° F.

The heat treatment at a temperature of about 130° F. is preferred, but this may be varied to between about 110° F. and 135° F.

Homogenization may be carried out between about 1200 p.s.i. and 8000 p.s.i. with the mixture at a temperature between about 100° F. and 130° F.

The skim milk usually has a solids not fat content between about 8% and 9% and can be used within the range in the foregoing example. A skim fortified by the addition of dry milk solids not fat to 10 or 11% may be used.

We claim:
The process of preparing sour cream comprising heating skim milk to about 235° F. for six seconds, cooling to about 71° F., inoculating with a lactic acid and diacetyl producing culture, incubating for about 14 hours at 71° F. and then mixing with melted butter oil in an amount to produce an 18% butter fat product, heating to about 130° F., homogenizing at about 2000 p.s.i., and spray drying, whereby a powdered sour cream is produced which is of excellent flavor.

References Cited in the file of this patent
UNITED STATES PATENTS

| | | |
|---|---|---|
| 2,656,276 | Toulmin | Oct. 20, 1953 |
| 2,671,729 | Fear et al. | Mar. 9, 1954 |
| 2,719,793 | Page et al. | Oct. 4, 1955 |
| 2,832,687 | Lane et al. | Apr. 29, 1958 |
| 2,918,371 | Jaffe et al. | Dec. 22, 1959 |